(12) United States Patent
Schopferer

(10) Patent No.: US 6,397,886 B1
(45) Date of Patent: Jun. 4, 2002

(54) DEVICE FOR SUPPLYING A CONSUMER DISPLACED ALONGSIDE A COMPRESSED AIR LINE

(75) Inventor: Joerg Schopferer, Efringen-Kirchen (DE)

(73) Assignee: Wampfler Aktiengesellschaft, Weil am Rhein-Maerkt (DE)

( * ) Notice: Subject to any disclaimer, the term of this patent is extended or adjusted under 35 U.S.C. 154(b) by 0 days.

(21) Appl. No.: 09/744,044

(22) PCT Filed: Jul. 16, 1999

(86) PCT No.: PCT/EP99/05067

§ 371 (c)(1), (2), (4) Date: Jan. 16, 2001

(87) PCT Pub. No.: WO00/05530

PCT Pub. Date: Feb. 3, 2000

(30) Foreign Application Priority Data

Jul. 22, 1998 (DE) .................................... 298 13 062 U

(51) Int. Cl.[7] .............................................. F16L 27/12
(52) U.S. Cl. ..................................................... 137/580
(58) Field of Search .......................... 137/580; 285/325, 285/188, 133.11; 454/64

(56) References Cited

U.S. PATENT DOCUMENTS

| | | | | |
|---|---|---|---|---|
| 2,798,506 A | * | 7/1957 | Baker et al. ................. | 137/580 |
| 3,019,813 A | * | 2/1962 | Dommann ................... | 137/580 |
| 3,326,234 A | * | 6/1967 | Baker et al. ................. | 137/580 |
| 3,580,401 A | * | 5/1971 | Stahl ...................... | 137/580 X |
| 3,901,348 A | * | 8/1975 | Maras et al. ............. | 137/580 X |
| 3,903,917 A | * | 9/1975 | Ede ......................... | 137/580 X |
| 3,913,470 A | * | 10/1975 | Cullen .................... | 137/580 X |
| 3,952,492 A | | 4/1976 | Miyazaki et al. ........ | 137/580 X |
| 4,117,773 A | * | 10/1978 | Johnson ................... | 137/580 X |
| 4,173,176 A | * | 11/1979 | Svensson ................ | 137/580 X |
| 4,233,889 A | * | 11/1980 | Nederman .............. | 137/580 X |
| 4,483,362 A | * | 11/1984 | Luginbuhl .............. | 137/580 X |
| 4,945,950 A | * | 8/1990 | Nilsson ................... | 137/580 X |
| 5,570,717 A | * | 11/1996 | Stoll ......................... | 137/580 |
| 6,102,069 A | * | 8/2000 | Di Betta et al. ........ | 137/580 X |

FOREIGN PATENT DOCUMENTS

| | | |
|---|---|---|
| CH | 15021 | 7/1897 |
| DE | 1103866 | 4/1961 |
| DE | 2943504 | 5/1981 |
| EP | 0334995 | 10/1989 |

* cited by examiner

*Primary Examiner*—John Rivell
(74) *Attorney, Agent, or Firm*—Flynn, Thiel, Boutell & Tanis, P.C.

(57) ABSTRACT

A device for supplying a consumer displaceable alongside a compressed air line (1) with compressed air. The compressed air line (1) presents a lateral slit (2) through which a hollow flexible tube (10, 10A), which is joined to the consumer, protrudes into the compressed air line (1) and the slit (2) is sealed off from the surroundings by an elastic sealing tape (3, 3A) which in the area of the flexible tube (10, 10A) is deformed by same to avoid pressure losses to the surroundings. The flexible tube (10, 10A) opens into a pipe section (11) which can be displaced inside the compressed air line (1) and its ends are sealed in relation to the walls of the compressed air line (1), and the distance between the seals (12, 13) is greater than the area of the sealing tape (3, 3A) deformed by the flexible tube (10, 10A).

10 Claims, 5 Drawing Sheets

DEVICE FOR SUPPLYING A CONSUMER DISPLACED ALONGSIDE A COMPRESSED AIR LINE

The invention relates to a device for supplying a consumer displaced alongside a compressed air line according to the preamble of claim 1.

Such a device is the subject matter of CH-A-15021. Same has a compressed air line having a longitudinally extending slit. The slit is sealed off by two sealing lips projecting into the inside of the compressed air line. To tap into the compressed air line, a hollow flexible tube is provided which projects into the inside of the compressed air line and hereby spreads the two sealing lips apart. The flexible tube can be displaced alongside the slit.

The sealing lips are also spread apart, viewed in direction of displacement, directly in front of and behind the flexible tube so that compressed air can escape to the outside through the there formed key-like gap. This results in an undesired pressure drop in the compressed air line.

The purpose is to provide the device of the above-mentioned type in such a manner that loss of compressed air to the atmosphere is avoided.

This purpose is attained with the characteristics of claim 1. Advantageous developments can be taken from the subclaims.

Two exemplary embodiments will be discussed in greater detail hereinafter in connection with the drawings, in which.

Figure 1:
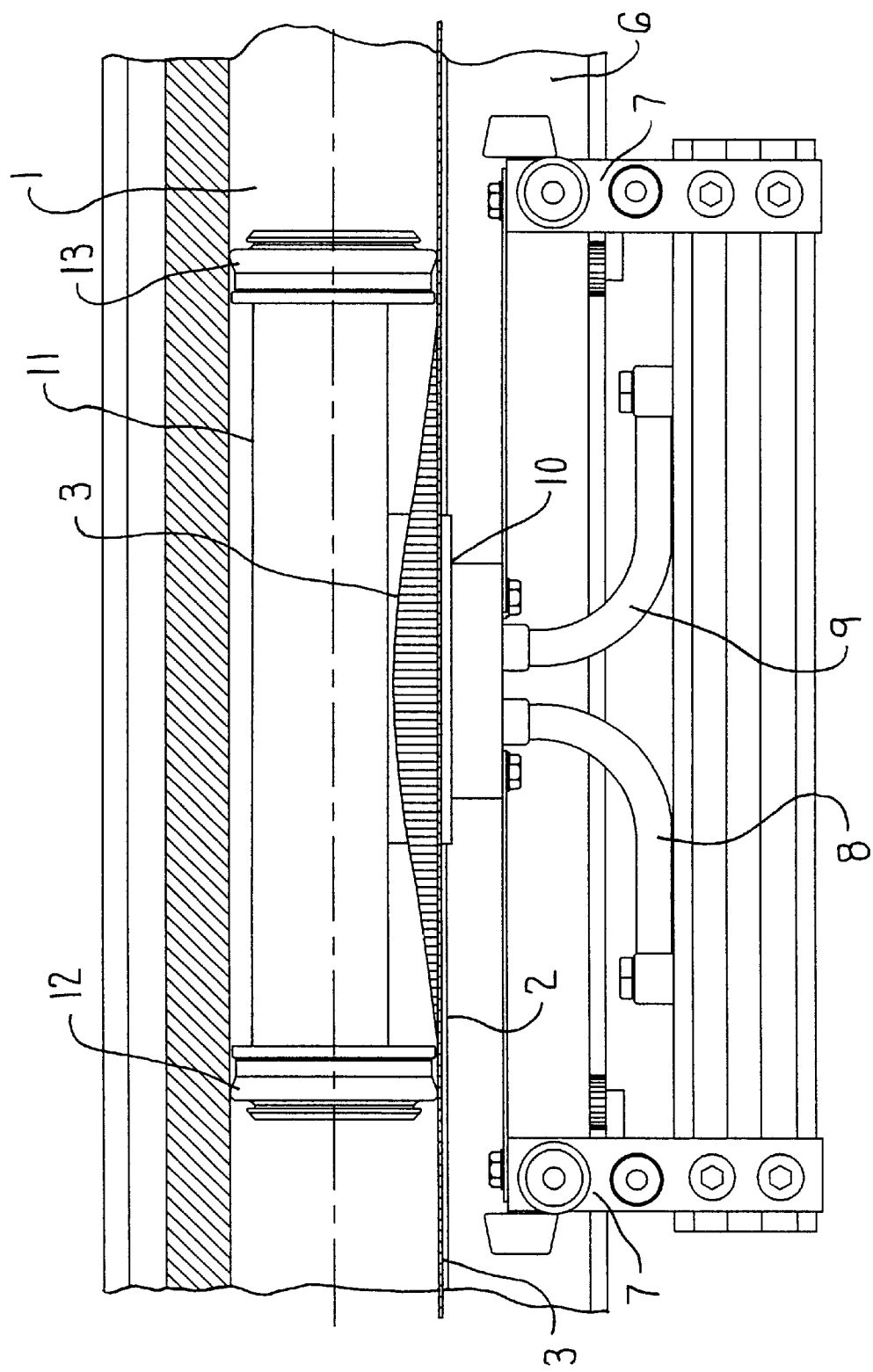
FIG. 1 is a partially cross-sectioned side view of a first embodiment.
Figure 2:
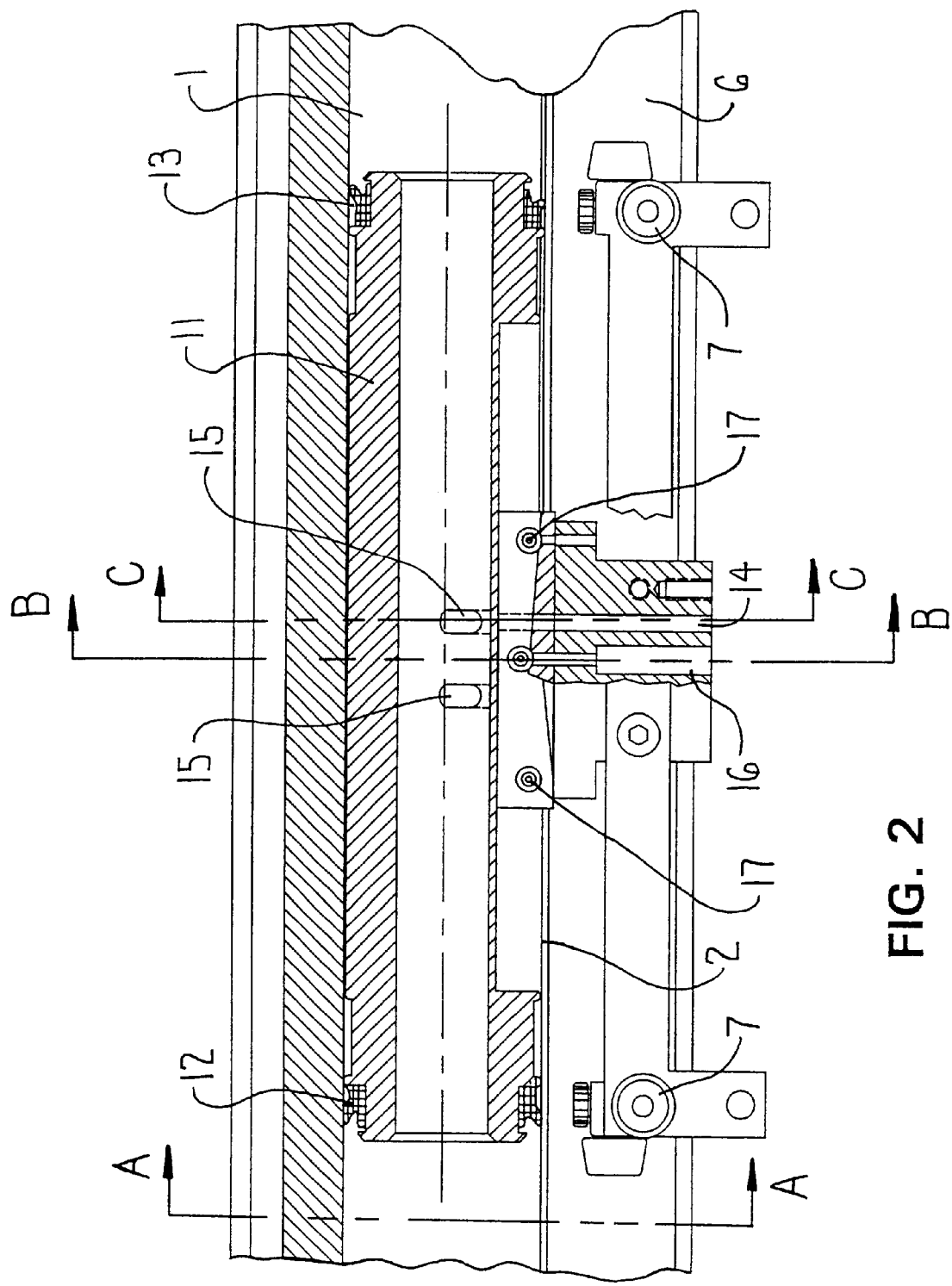
FIG. 2 is a partially cross-sectioned side view of the first embodiment.
Figure 3:
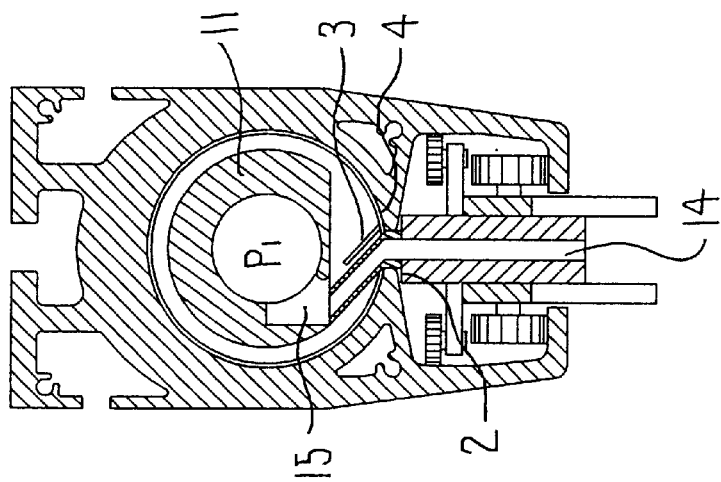
FIG. 3 is a cross-sectional view taken along the line A—A of FIG. 2.
Figure 4:
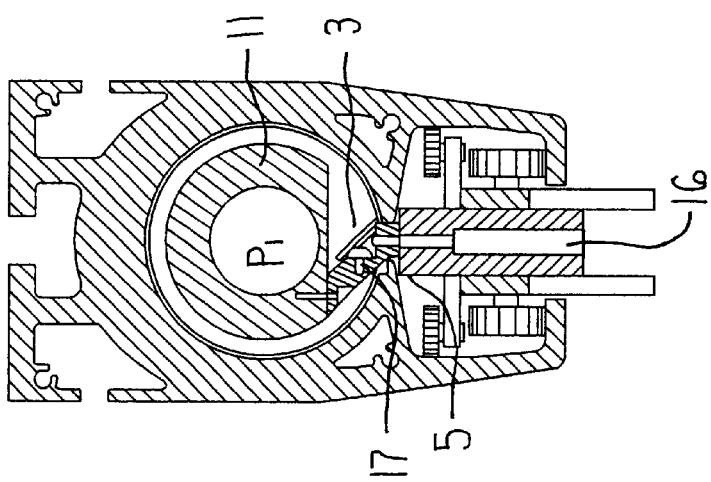
FIG. 4 is a cross-sectional view taken along the line B–B of FIG. 2.
Figure 5:
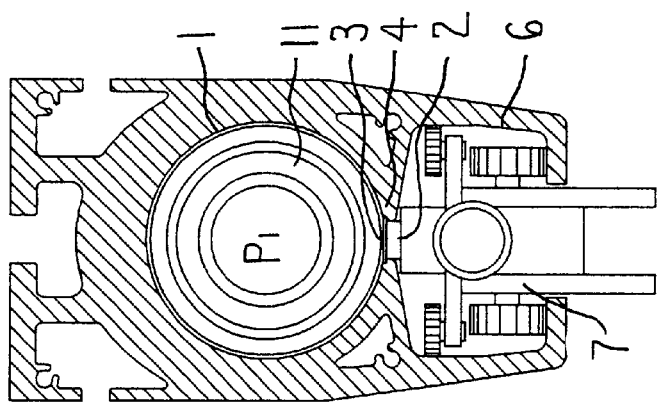
FIG. 5 is a cross-sectional view taken along the line C—C of FIG. 2.

A compressed air line 1 having a circular cross section is provided according to FIGS. 1 to 5. This compressed air line has a longitudinally extending slit 2 on its underside. This slit 2 is covered by a flat elastic sealing tape 3, the one longitudinal side of which is connected to one of the slit edges 4. The other, free longitudinal side of the sealing tape 3 rests on an inside step 5 of the other slit edge. Due to the inside pressure existing in the compressed air line 1, the sealing tape 3 thus seals off the slit 2.

The compressed air line 1 has in its lower area guideways in which a carriage 7 of a consumer is guided. A flexible tube 10 is connected to the carriage 7 through two rigid tubes 8, 9. This flexible tube 10 extends through the slit 2 and grips under the sealing tape 3. This sealing tape 3 is thereby lifted off from the step 5.

A pipe section 11 is rigidly connected to the flexible tube 10 inside of the compressed air line 1. This pipe section 11 has a seal 12, 13 at each of its ends. Two bores 14 extend through the flexible tube, of which bores one is connected to the tube 8 and the other one is connected to the tube 9. The bore 14 extends inclined in direction of the pipe section 11 and terminates in a bore 15 which is connected to the inside of the pipe section 11. A vent opening 16 is furthermore provided on the flexible tube, which vent opening terminates on the outside of the pipe section 11.

The pressure, which exists inside of the compressed air line 1, exists in the same manner inside of the pipe section 11. Compressed air is fed through the bores 15, 14 to the tube 9 from inside of the pipe section 11. This is also true in a corresponding manner for the tube 8 with respect to the bores 14 and 15, which connections are not illustrated. Atmospheric pressure is provided through the vent opening 16 to the area between the seals 12, 13. The elastic sealing tape 3 is lifted off from the slit 2 in the area between the seals 12, 13, as this is clearly illustrated in FIG. 1. However, because of the seals 12, 13 compressed air cannot escape into the area between the seals 12, 13 through the slit 2 not covered by the sealing tape 3.

In order to keep the friction between the flexible tube 10 and the sealing tape 3 as low as possible, the flexible tube 10 has three rollers 17, which rest against the underside of the sealing tape 3.

Figure 6:
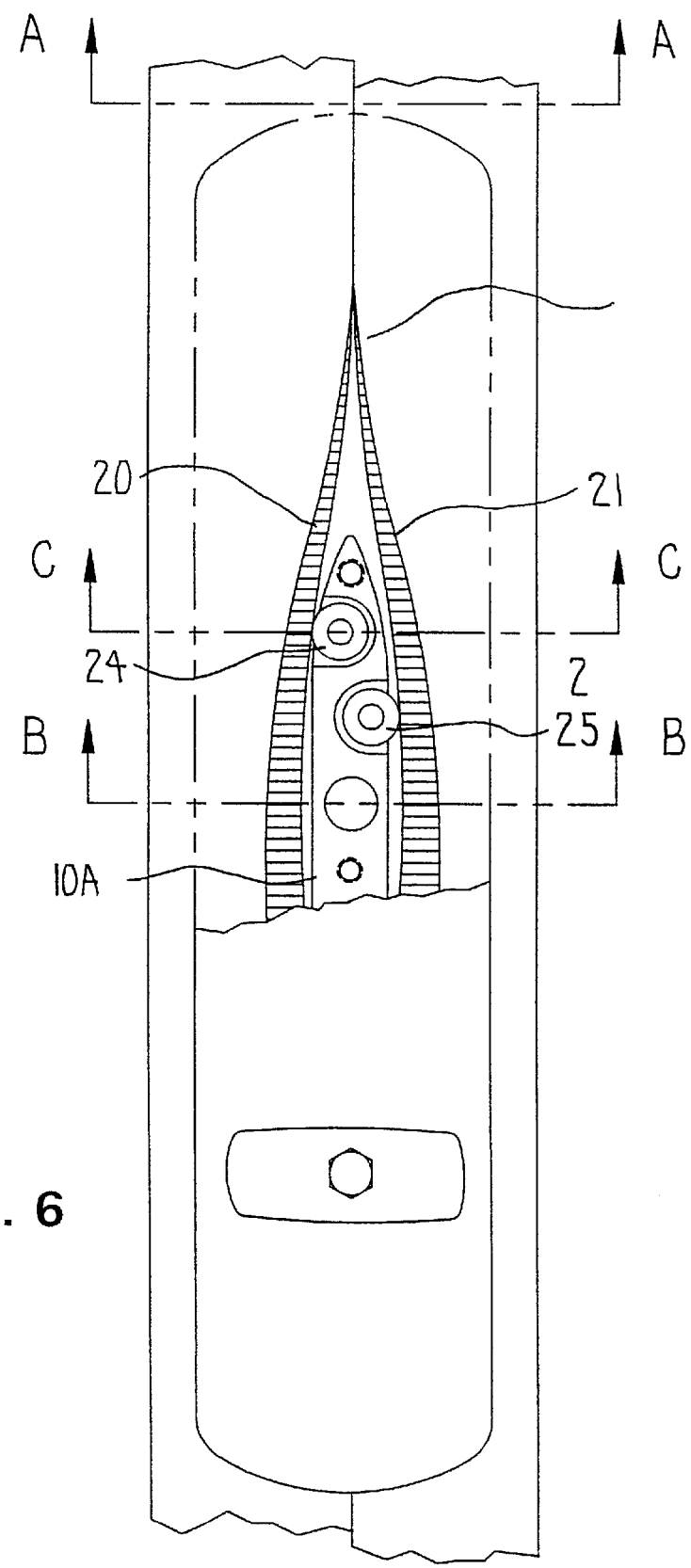
FIG. 6 is a view from below of a second embodiment.
Figure 7:
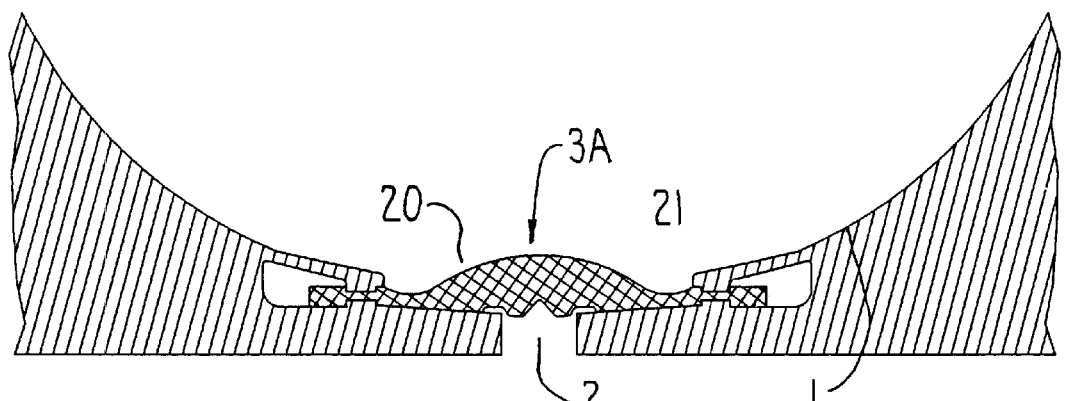
FIG. 7 is a cross-sectional view taken along the line C—C of FIG. 6.
Figure 8:
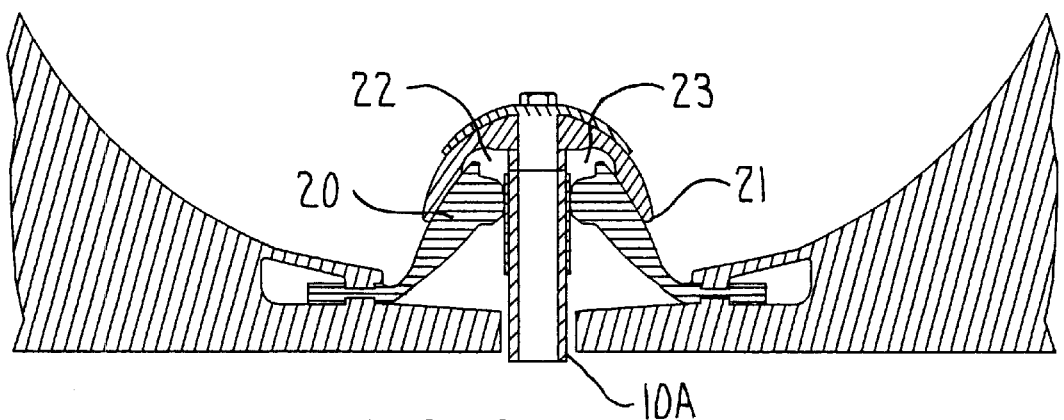
FIG. 8 is a cross-sectional view taken along the line A–A of FIG. 6.
Figure 9:
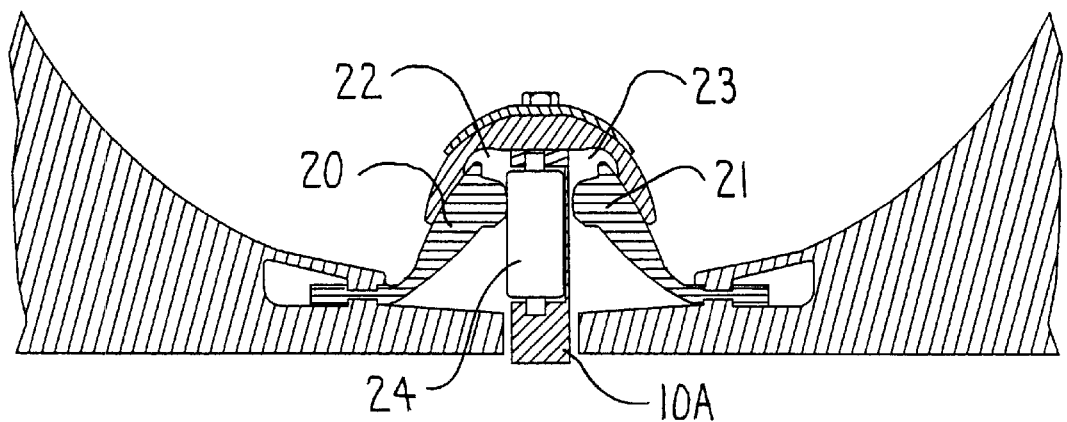
FIG. 9 is a cross-sectional view taken along the line B—B of FIG. 6.

The flexible tube 10A is in the embodiment according to FIGS. 6 to 9, viewed in longitudinal direction of the compressed air line 1, designed like the shape of a boat. The sealing tape 3A consists of two overlapping parts 20, 21, which are both pivoted upwardly by the flexible tube 10A. The flexible tube 10A has two grooves 22, 23 extending in longitudinal direction, against which the free ends of the two parts 20, 21 of the sealing tape 3A are pivoted. The flexible tube has vertically arranged rollers 24, 25, which rest against the undersides of the two parts 20, 21 of the sealing tape 3A in order to reduce friction.

What is claimed is:

1. A device for supplying a consumer displaced alongside a compressed air line with compressed air, in which the compressed air line has a longitudinally extending slit which is sealed off from the surrounding area by an elastic sealing tape, through which slit a flexible tube connected to the consumer extends into the inside of the compressed air line, whereby the sealing tape is deformed in the area of the flexible tube by the flexible tube, and the flexible tube terminates in a pipe section which is displaceable in the compressed air line, is sealed off at its ends against the wall of the compressed air line by seals, the distance between seals is greater than the area of the sealing tape, which area is deformed by the flexible tube, wherein the sealing tape is tilted by the flexible tube into the inside of the compressed air line, and wherein the seals hold at both ends of the pipe section the sealing tape in a closed position.

2. The device according to claim 1, wherein the sealing tape is designed flat, is connected at one longitudinal side to one of the one slit edges, and rests on the inside on the other slit edge.

3. The device according to claim 2, wherein the flexible tube extends from the one slit edge approximately tangentially to the pipe section and carries rollers resting against the underside of the sealing tape.

4. The device according to claim 1, wherein the flexible tube is designed carriage-like, and has ramps at both sides gripping under the sealing tape.

5. The device according to claim 1, wherein the flexible tube is designed like a boat and the sealing tape is divided into two sections, and the flexible tube extends between the two parts of the sealing tape.

6. The device according to claim 5, wherein the two parts of the sealing tape are connected to the slit edges and overlap with their free ends.

7. The device according to claim 5, wherein the flexible tube carries rollers resting against the two parts of the sealing tape.

8. The device according to claim 5, wherein the flexible tube has two grooves extending in longitudinal direction, into which grooves tilt the free ends of the two parts of the sealing tape.

9. The device according to claim 1, wherein the pipe section is flattened in the area of the flexible tube.

10. The device according to claim 1, wherein the compressed air line has guideways for the consumer.

* * * * *